Feb. 8, 1938.   W. BUSCHBECK   2,107,408
METHOD OF MATCHING THE IMPEDANCE OF A LOAD TO A SOURCE OF POWER
Filed July 25, 1936
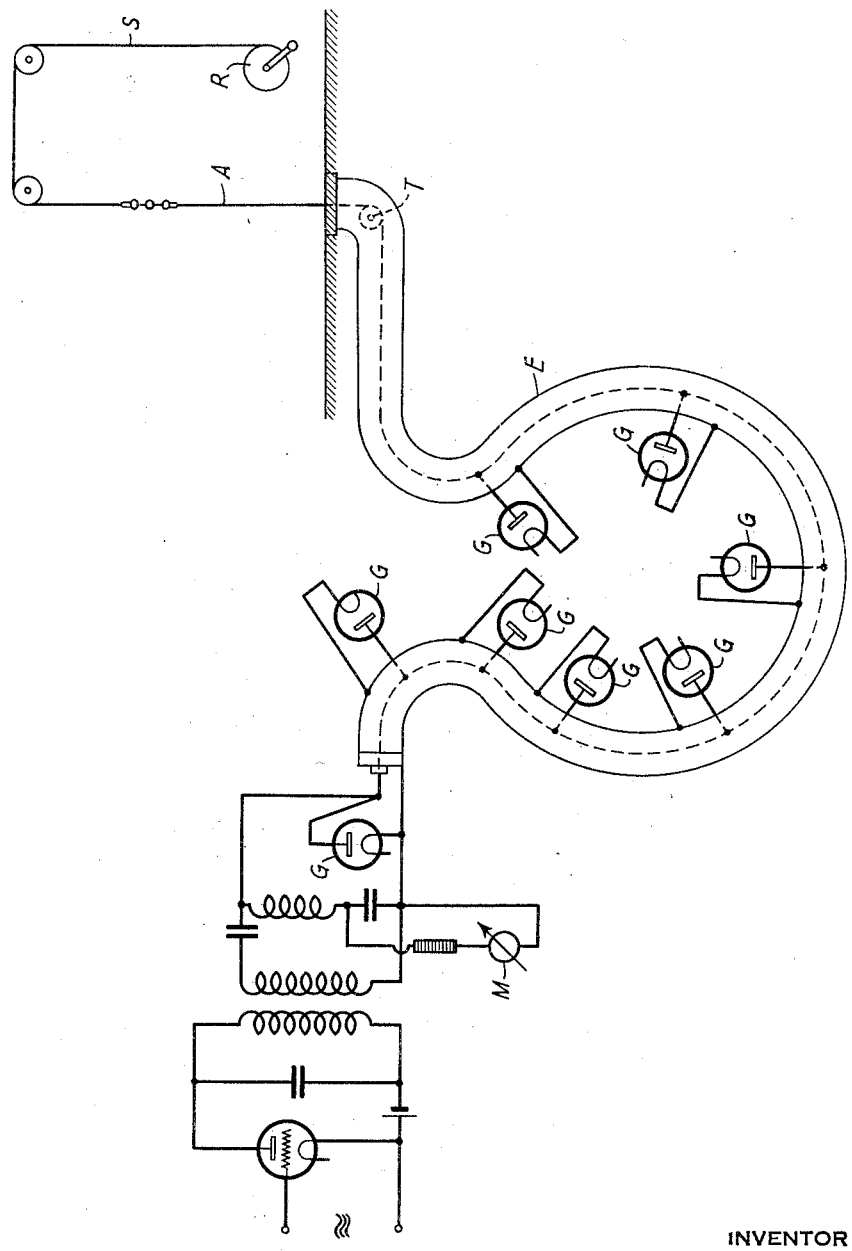
INVENTOR
WERNER BUSCHBECK
BY
ATTORNEY Patented Feb. 8, 1938

2,107,408

UNITED STATES PATENT OFFICE 2,107,408

METHOD OF MATCHING THE IMPEDANCE OF A LOAD TO A SOURCE OF POWER

Werner Buschbeck, Berlin, Germany, assignor to Telefunken Gesellschaft für Drahtlose Telegraphie m. b. H., Berlin, Germany, a corporation of Germany Application July 25, 1936, Serial No. 92,534
In Germany August 20, 1935

3 Claims. (Cl. 178—44)

It is frequently the case, at high frequency stations, that a transmitter, instead of directly feeding a load, is applied across a transmission or power line which, in turn, is connected to the load. In order to minimize the insulation requirements as well as to minimize the copper losses in the line, it is desired that the power be transmitted to the greatest extent possible only in the form of a traveling wave and to avoid standing waves. As is known, this desideratum is attained by making the load resistance at the end of the cable a pure ohmic resistance of the order of the surge impedance of the line.

In stationary arrangements operating only with a single frequency, this desideratum can adjustably be attained, by means known in the art, once for all times during the operation of the circuit, but this is not possible in stations operating with greatly different frequencies, and in which the tuning of the load, for example an antenna, is often carried out by remote control. In this case, there are obstacles to be overcome which render the tuning extremely difficult. For example, in the case of an antenna fed from a transmitter connected to a power line, the procedure was hitherto such that the antenna resistance, transformed to the surge impedance by special arrangements, was simply placed at the end of the cable (which can be done in a simple manner only in case of longer waves) or the transmitter was at first tuned to the desired wave after which attempts were made to match as closely as possible the impedance of the antenna with that of the power line through lengthening or shortening of the antenna. To achieve this purpose, it was customary to make a measurement of the voltage or current at the input or end of the cable, from which it was determined what adjustment it was necessary to make of the voltage (or current) in order to obtain maximum power for the transmitter. The voltage is found from the surge impedance of the line and from the power.

In this last method of tuning it could not readily be ascertained whether the highest efficiency of the transmission was attained, i. e., whether the highest possible power was radiated from the antenna, and whether the voltage load of the line remained within allowable limits, since it could never be safely determined whether an ohmic resistance of the order of the surge impedance actually existed at a place of the tuning. Thus it could not be observed to which extent standing waves appeared on the line.

In accordance with the present invention the most favorable impedance matching of a load (for example transmitting antennas) to the power lines is obtained by equipping the power or transmission line entirely, or in part, with discontinuous or continuous voltage or current measuring arrangements operating upon a common indicator, and thereby indicating the minimum of standing waves. The minimum of standing waves will occur when the best impedance match occurs.

The invention will be explained by reference to the accompanying figure, which shows an antenna A adapted to be excited over a range of wavelengths by a transmitter over a transmission or power line E.

The power line E is tapped along any desired section having a minimum length of $$\frac{\lambda \text{ max.}}{4}$$

(where $\lambda$ max. is the maximum wavelength to be radiated over the antenna) which section may be wound on a drum in the transmitter room for the sake of convenience, whereby the distances between the tap points (at least at the beginning) must not be greater than $$\frac{\lambda \text{ min.}}{8}$$

(where $\lambda$ min. is the minimum wavelength to be radiated over the antenna), and at each tap there is placed a peak voltage measuring instrument G (detector), all of which operate upon a common indicating instrument M, whereby the power line may at the same time also be utilized as a measuring line. The indicating instrument M is the only direct current return path for current flowing through any or all of the detectors (rectifiers) G; consequently upon the functioning of any or all of the rectifiers, the meter M will indicate the voltage across the line. The rectifiers cause an indication of meter M which is proportional to the maximum peak voltage on any point existing along the cable.

In the simplest case, the tuning is carried out by basing the tuning of the load upon a minimum of the maximum voltage appearing in the cable (in this example through winding-on or unwinding the antenna A from the drum T by means of the rope S wound about the roller R) and at the same time by varying the coupling, the high frequency input power of the cable (measuring the direct current consumption of the transmitter) is maintained constant. This constancy may also be obtained through automatic means.

In view of the multiplicity of places of measurement, the displacement of this maximum voltage along the cable at different places of tuning at the cable end, is of no importance. In fact, since the cable core or the common connection point of the detectors will, at high ohmic detector instruments, practically be charged to the peak value of the alternating voltage, only that detector or those detectors will function which are located at the place of the respective highest voltage, irrespective at which point of the cable this place happens to be.

Such a measuring arrangement may also be used to automatically disconnect the transmitter whenever an excessively high voltage appears which may endanger the power line. Such excessively high voltages can appear when there are mechanical defects in the antenna, or in the case of atmospheric discharges.

Obviously the principle of the invention is not limited to the system illustrated and described above. For example, in the case of ultra short waves, it may be desirable to distribute the detection elements G in a continuous fashion along the line by placing the line under vacuum and providing an electron emitting conductor. Furthermore, the insulating spacers which are always necessary between the conductors of the line could, at the same time, be constructed as detectors (for instance dry rectifier columns).

Moreover, if desired, the currents in the line could be measured instead of the voltages. To effect this, a current converter could be inserted in the power line. In this last case, however, the measuring arrangement would be more complicated than in the case where voltages are measured.

Under certain conditions it may be preferable to reduce, in the measuring length, the electrical wavelength relative to the mechanical length, for instance, by the use of dielectrics having a dielectric constant greater than 1, or by spiral shaped inner conductors (higher inductances).

I claim:

1. In a high frequency system, a transmission line, an adjustable load at one end of said line adapted to be excited over a range of wavelengths, a source of power at the other end of the line, a plurality of rectifiers across said line at intervals so arranged as to insure that at least one rectifier will be acted upon by a voltage substantially equal to the anti-nodal voltage of a standing wave of any wavelength in the range of wavelengths to be employed, and a direct current indicator circuit connected in shunt to said line.

2. In a high frequency system, a transmission line, an adjustable load at one end of said line adapted to be excited over a range of wavelengths, a source of power connected to the other end of said line, a plurality of energy responsive devices in circuit with said line at intervals relatively small with respect to the minimum wavelength, and an indicator circuit connected to said line for indicating the aggregate response of said devices.

3. In a high frequency system having a two conductor transmission line, an adjustable load at one end of said line, a source of power at the other end of said line, a section of said line of a length of the order of one-quarter of the wavelength employed being arranged to possess unilateral conductivity between the conductors of the line, and an indicating device connected between the conductors of said line for indicating the maximum voltage across that section.

WERNER BUSCHBECK.